US007504791B2

(12) United States Patent
Sieber et al.

(10) Patent No.: US 7,504,791 B2
(45) Date of Patent: Mar. 17, 2009

(54) ELECTRIC POWER TOOL WITH OPTIMIZED OPERATING RANGE

(75) Inventors: Gustav Sieber, Miskolc (HU); Ulrich Single, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 122 days.

(21) Appl. No.: 10/561,312

(22) PCT Filed: Nov. 23, 2004

(86) PCT No.: PCT/DE2004/002582

§ 371 (c)(1), (2), (4) Date: Dec. 19, 2005

(87) PCT Pub. No.: WO2005/010497

PCT Pub. Date: Feb. 3, 2005

(65) Prior Publication Data

US 2007/0095149 A1 May 3, 2007

(30) Foreign Application Priority Data

Jan. 22, 2004 (DE) ....................... 10 2004 003 203

(51) Int. Cl.
*H02P 29/00* (2006.01)

(52) U.S. Cl. ....................................... 318/433; 388/937

(58) Field of Classification Search ......... 318/430–434; 388/937

See application file for complete search history.

(56) References Cited

U.S. PATENT DOCUMENTS

| | | | | |
|---|---|---|---|---|
| 3,902,283 | A * | 9/1975 | Bean | 451/9 |
| 4,268,999 | A * | 5/1981 | Noto et al. | 451/5 |
| 4,410,846 | A | 10/1983 | Gerber et al. | |
| 4,487,270 | A | 12/1984 | Huber | |
| 4,534,420 | A * | 8/1985 | Goldelius | 173/176 |
| 4,540,318 | A * | 9/1985 | Hornung et al. | 408/9 |
| 4,666,352 | A * | 5/1987 | Nagao et al. | 409/153 |
| 4,688,970 | A * | 8/1987 | Eckman | 408/9 |
| 4,772,161 | A * | 9/1988 | Nagao et al. | 409/148 |
| 4,780,654 | A * | 10/1988 | Shoji et al. | 318/434 |
| 5,014,793 | A | 5/1991 | Germanton et al. | |
| 5,116,168 | A * | 5/1992 | Aihara | 408/1 R |
| 5,230,458 | A * | 7/1993 | Asanasavest | 228/102 |
| 5,239,479 | A * | 8/1993 | Nolting et al. | 700/174 |
| 5,568,028 | A * | 10/1996 | Uchiyama et al. | 318/566 |
| 5,584,744 | A * | 12/1996 | Shirai et al. | 451/5 |
| 5,894,095 | A | 4/1999 | DeMali | |
| 6,000,313 | A * | 12/1999 | Becker et al. | 89/40.02 |
| 6,172,472 | B1 * | 1/2001 | Klingbeil | 318/244 |
| 6,352,596 | B2 * | 3/2002 | Beardsley et al. | 134/6 |
| 6,602,110 | B2 * | 8/2003 | Yi et al. | 451/9 |
| 6,665,948 | B1 * | 12/2003 | Kozin et al. | 33/833 |

(Continued)

FOREIGN PATENT DOCUMENTS

| | | |
|---|---|---|
| CN | 2074697 | 4/1991 |

(Continued)

*Primary Examiner*—Bentsu Ro
(74) *Attorney, Agent, or Firm*—Michael J. Striker

(57) ABSTRACT

The invention relates to an electric power tool (1), having an electric motor (8) that serves to drive a tool (6). The electric power tool (1) is characterized in that a sensor unit (9) that detects the contact pressure of the tool (6) against a workpiece (7) cooperates with a signal transducer (10).

16 Claims, 6 Drawing Sheets

U.S. PATENT DOCUMENTS

Figure 1:
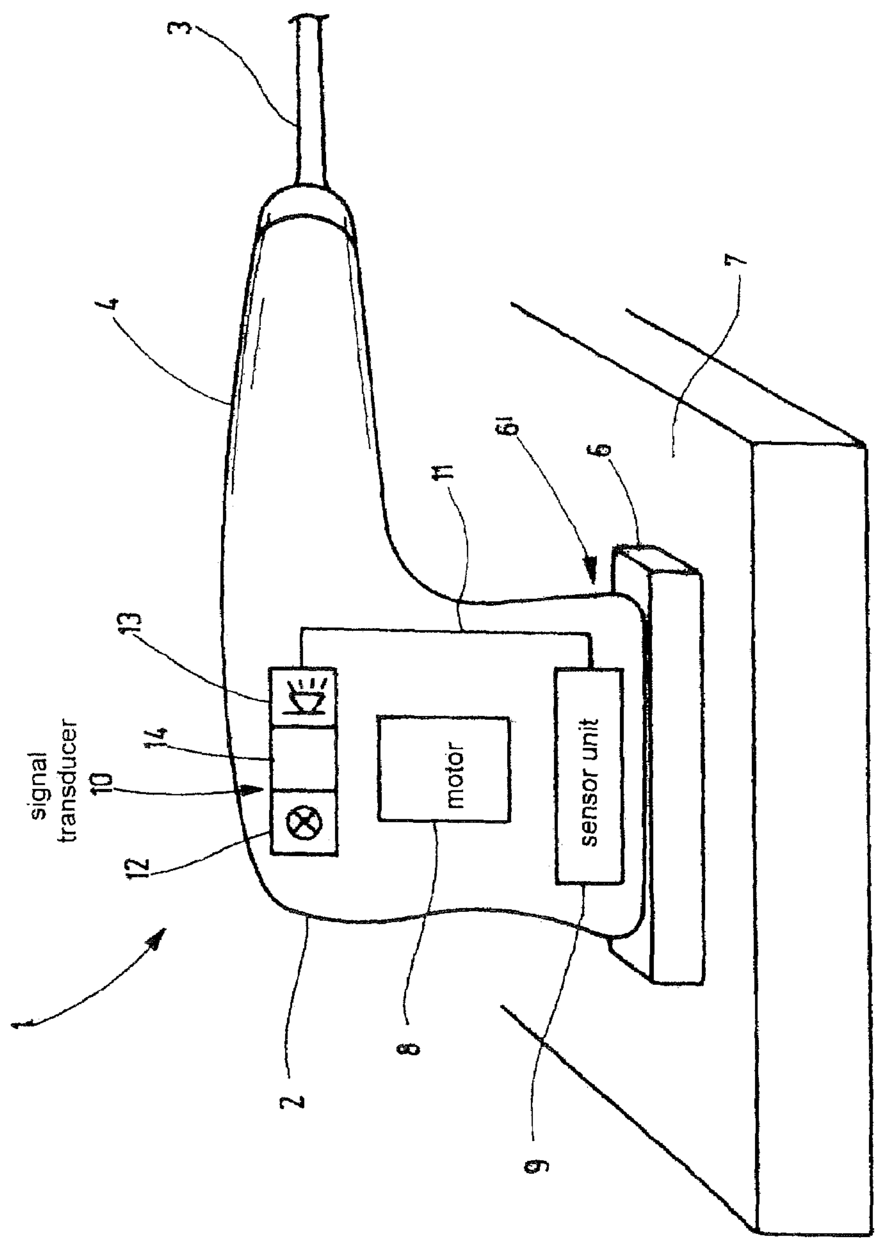

| | | | | |
|---|---|---|---|---|
| 6,799,643 | B2 | 10/2004 | Voulkidis et al. | |
| 6,906,276 | B2 * | 6/2005 | Kaeseler et al. | 219/86.41 |
| 2003/0003847 | A1 * | 1/2003 | Yi et al. | 451/9 |
| 2003/0017793 | A1 * | 1/2003 | Goldau et al. | 451/177 |
| 2003/0184308 | A1 | 10/2003 | Fiebig | |
| 2003/0196824 | A1 | 10/2003 | Gass et al. | |

FOREIGN PATENT DOCUMENTS

| | | |
|---|---|---|
| CN | 2145601 | 11/1993 |
| CN | 2200252 | 6/1995 |
| DE | 101 60 864 | 6/2003 |
| EP | 0 659 525 | 6/1995 |
| JP | 10286772 | 10/1998 |

* cited by examiner

ELECTRIC POWER TOOL WITH OPTIMIZED OPERATING RANGE

The invention relates to electric power tools and to methods for guiding the operation of electric power tools.

PRIOR ART

Electric power tools are known, for example in the form of power drills, drilling screwdrivers, power grinders, and eccentric grinders. These electric power tools in general have a rotatable receptacle for a tool. The tool receptacle is driven by an electric motor. Simple versions of electric power tools have a fixed rotary speed specified for idling. Somewhat better versions of electric power tools have the capability, depending on the application, that a different rotary speed can be set. In electronically regulated electric power tools, this rotary speed, once set during idling, is kept constant during the work, or in other words under load. In the work process, the user presses the electric power tool with its tool against the object to be machined. In the case of an eccentric grinder, a grinding substrate for instance forming the tool is pressed against a workpiece to be ground. Each user will exert a different contact pressure during the work process, depending on his constitution and/or how he feels that day. The outcome of the work differs depending on the contact pressure exerted. In the example of the eccentric grinder given, the grinding quality, or in other words the nature of the surface of the workpiece after grinding, will have different qualities for grinding operations that are performed at different contact pressures. Moreover, the rate of removal of material also fluctuates as a function of the contact pressure. The probability is very high that the contact pressure will not be kept constant over the duration of a work process by the user, and hence the work process will not be carried out uniformly. It is also desirable to exert the contact pressure in a replicable way, or in other words if the work process is interrupted to resume it with the same contact pressure. It is important above all that regardless of a particular user, the same, suitable value for the contact pressure be reached for the same work processes. Skilled users are capable, within a range of tolerance, of exerting the suitable contact pressure and of also keeping it constant during the entire work process. Less-skilled users will attain only less-satisfactory results of their work.

ADVANTAGES OF THE INVENTION

The electric power tool of the invention, having an electric motor used to drive a tool, is distinguished in that a sensor unit that detects the contact pressure of the tool against a workpiece cooperates with a signal transducer. Because the contact pressure employed is visible to the user by means of the signal transducer, the user can tell whether he is exerting a contact pressure within an optimized operating range. The optimized operating range assures excellent outcomes of the work. If the contact pressure is above the contact pressure of the optimized operating range, the user can lower the contact pressure because of the feedback from the signal transducer. Conversely, if an overly low value for the contact pressure being exerted is displayed, the user can increase the contact pressure. The feedback from the signal transducer can, in addition to the indication described above, also be made possible by displaying whether the value of the contact pressure is being kept constant during the work process, or whether the user is varying it unintentionally. With the electric power tool of the invention, it is thus possible to monitor the contact pressure and, by suitable provisions made by the user, to keep it at a suitable value, and in particular keep it constant, during a work process. Moreover, the electric power tool of the invention satisfies the prerequisite that a work process after being interrupted will be continued with the same contact pressure.

According to the invention, it is moreover provided in addition or as an alternative that the electric power tool has an electric motor, serving to drive a tool, a control and/or regulating unit, which serves to guide the operation of the electric motor and which cooperates with the sensor unit, which detects the contact pressure of the tool against the workpiece. In this way, the control and/or regulating unit is capable of adapting the guidance of the operation of the electric motor to the contact pressure being employed by the user at that moment. The quality of the outcome of the work attainable with an electric power tool is defined by a plurality of work parameters. These work parameters are among others the contact pressure and work parameters that are affected by the electric motor, such as the torque and the rpm of the tool. For performing an optimized work process, it is necessary that these work parameters be adapted to one another. The electric power tool of the invention satisfies the prerequisite for this, which is that by means of the control and/or regulating unit, the optimized work parameters of torque and/or rpm that pertain to the contact pressure being employed at the moment are set. The user of the electric power tool can thus devote his full concentration to the work process, for instance the grinding or drilling operation, yet still has the certainty that the work process is taking place within the optimized operating range, at least with regard to the detected or measured variables. If the user changes the contact pressure, the control and/or regulating unit responds by readjustment, for instance of the torque, so that the work process remains within the desirable range, and an optimal outcome of the work is attained.

In a preferred exemplary embodiment, the electric power tool is characterized in that the sensor unit has a strain gauge and/or a piezoelectric sensor. Direct measurement of the contact pressure of the tool against the workpiece is thus possible. Moreover, the contact pressure can be measured very precisely. In addition, these sensors have a small structural size. They can therefore easily be integrated into the electric power tool.

In a further, preferred exemplary embodiment, the electric power tool is characterized in that the sensor unit has a current-measuring device, which detects the current of the electric motor. From the applicable motor current, the contact pressure employed at that instant can be derived. Under load, a defined torque will be established which is dependent on the motor current. As long as the electric motor is not in saturation, as can happen particularly in idling, the torque is proportional to the square of the motor current. Conversely, if because of a load the electric motor is in saturation, the torque is essentially proportional to the motor current. If the contact pressure is increased, the current of the electric motor will increased. If the contact pressure is reduced, the motor current will be less. Thus by determining the motor current, the contact pressure can be determined by relative ascertainment. This is advantageous, because it is an inexpensive way of determining the contact pressure without making structural changes (which are necessary, if force sensors are used) in the electric power tool.

In a further, preferred exemplary embodiment, the electric power tool has a current-measuring device, which includes a shunt through which the motor current flows and an electronic evaluation unit. The current measurement by means of a shunt is very precise. The voltage dropping at the shunt is measured and, by means of the known resistance value of the shunt, is converted in the electronic evaluation unit into a current value or a statement about the contact pressure.

In a further, preferred exemplary embodiment, the signal transducer is an optical and/or an acoustical signal transducer and/or a signal transducer that calls on the sense of touch. It is advantageous to provide signal transducers that call on various senses of a user, since the electric power tools are used in various working environments. For instance, in a noisy working environment, it may be advantageous to use an optical signal transducer or a signal transducer that calls on the user's sense of touch, rather than an acoustical signal transducer. In a working environment that has many visual stimuli, or if the work process requires precise observation of the work by the user, it may be more appropriate to use an acoustical signal transducer.

In a preferred exemplary embodiment, the optical signal transducer contains at least one LED and/or an LED array and/or a display and/or a bar display. The aforementioned optical signal transducers have low energy consumption and are structurally small. LEDs of various colors can be used, and thus by the color at color transitions, in the "on/off" function, and/or the variation in brightness make a differentiated statement of the contact pressure possible. With display gauges, it is also possible to display concrete measured values. By means of bar displays, not only can the instantaneous value of the contact pressure be displayed, but a statement about a trend can be made. If the desired contact pressure is in the middle of the bar display, for instance, then an overly high or overly low contact pressure can be determined simply by a marked deviation of the display from the middle.

In a further exemplary embodiment, an electric power tool is provided with an acoustical signal transducer, which is a speaker and/or a bell and/or a buzzer, or the like. Acoustical signals, such as bell sounds or tones emitted by a speaker are possible as signal sounds. Preferably, they are used such that when the signal sounds, this indicates to the user that in handling the electric power tool he is working in a non-optimized operating range. The pitch can also be varied with the deviation in contact pressure, so the user can be oriented very quickly.

In a further, preferred exemplary embodiment, it is provided that the speaker is assigned a device that has a speech output. It is advantageous here for instance that in addition to a simple signal, additional speech indications can be made, such as work instructions to the user.

In a further, preferred exemplary embodiment, it is provided that the control and/or regulating unit controls and/or regulates the torque of the tool, or of a tool receptacle, as a function of the contact pressure of the tool against the workpiece. In the work process, a load is exerted on the tool that is due to the interaction of the tool with the workpiece. In an eccentric grinder, because of the friction between the grinding surface and the surface of the workpiece, the driving electric motor is loaded. The load is dependent on the contact pressure and becomes greater when a greater contact pressure is exerted. In the electric motors used for electric power tools, braking causes a drop in the rpm of the tool and at the same time an increase in the torque. This can lead to a poor outcome of the work, such as flowing of the material at the surface of the workpiece. In that case, it makes sense to regulate the electric motor such that the torque is not increased. It can thus be advantageous to adapt the torque to the contact pressure being exerted at the moment by the user, in order to stay in or reach the optimized operating range.

In a preferred exemplary embodiment, in addition or as an alternative to the above torque, it is provided that the electric power tool, by means of the control and/or regulating unit, controls and/or regulates the rotary speed of the tool, or of a tool receptacle, as a function of the contact pressure of the tool against the workpiece. The rotary speed of a tool is in general lowered under load. On the other hand, in many kinds of application of an electric power tool, it is important for a good outcome of the work to work at a certain rpm. Thus it is advantageous to control and/or regulate the rpm of the tool as a function of the contact pressure, for instance to keep the rpm constant.

In a preferred exemplary embodiment of an electric power tool, it is provided that the control and/or regulating unit controls and/or regulates the torque of the tool, or of a tool receptacle, as a function of the contact pressure of the tool against the workpiece at a predetermined rotary speed. In electric power tools with an electronically regulated rotary speed, the rotary speed set by the user at the onset of the work process is kept constant. The torque is thus automatically adapted to the parameters of the particular contact pressure being exerted.

In a method of the invention for guiding the operation of an electric power tool that has an electric motor, in particular having a sensor unit and a signal transducer, in a first step, the contact pressure of the tool against the workpiece is determined automatically, so that in the next step, outputting the contact pressure can create one possible way for the user to vary the contact pressure. It is advantageous that the user working with the electric power tool is supported in his handling of it. The term support here means that during the entire work process, he receives feedback as to whether he is exerting the contact pressure in the optimized operating range and/or whether he is keeping the contact pressure constant. Based on the feedback from the signal transducer, he is in a position to change the contact pressure, and he is given feedback on whether the change was sufficient. If he has changed the contact pressure unintentionally, he is told this and can readjust it. For instance, if a bar display is used as the signal transducer, the user must merely take care that the value indicated for the contact pressure he is exerting remains in the correct range of the display field. He immediately sees when he changes the contact pressure and can react.

In a further, preferred method for guiding the operation of an electric power tool having an electric motor, in particular with a sensor unit and a control and/or regulating unit, after the automatic determination of the contact pressure of the tool against the workpiece, the torque of the tool receptacle, or of the tool, is controlled and/or regulated by means of the control and/or regulating unit, particularly taking a predetermined rpm into account. Advantageously, the required optimized work parameters here are stored in a memory of the control and/or regulating unit. The control and/or regulation of the torque can then be done very quickly and precisely, taking the currently exerted contact pressure into account. In this way, the work process is always done in the optimized operating range. Hence not only is the outcome of the work optimized, but also the length of the work process.

DRAWINGS

The invention will be described in further detail below in terms of several exemplary embodiments in conjunction with the drawings.

Figure 7:
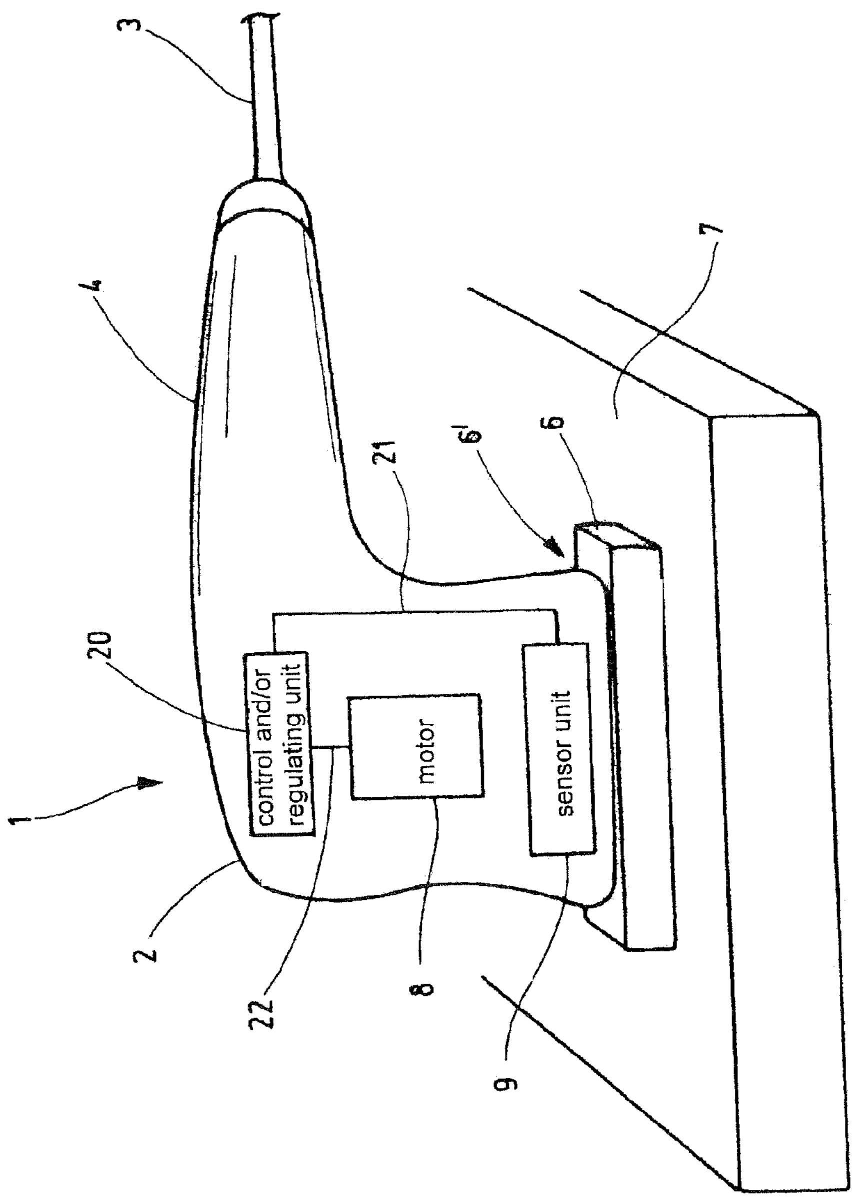
Figure 8:
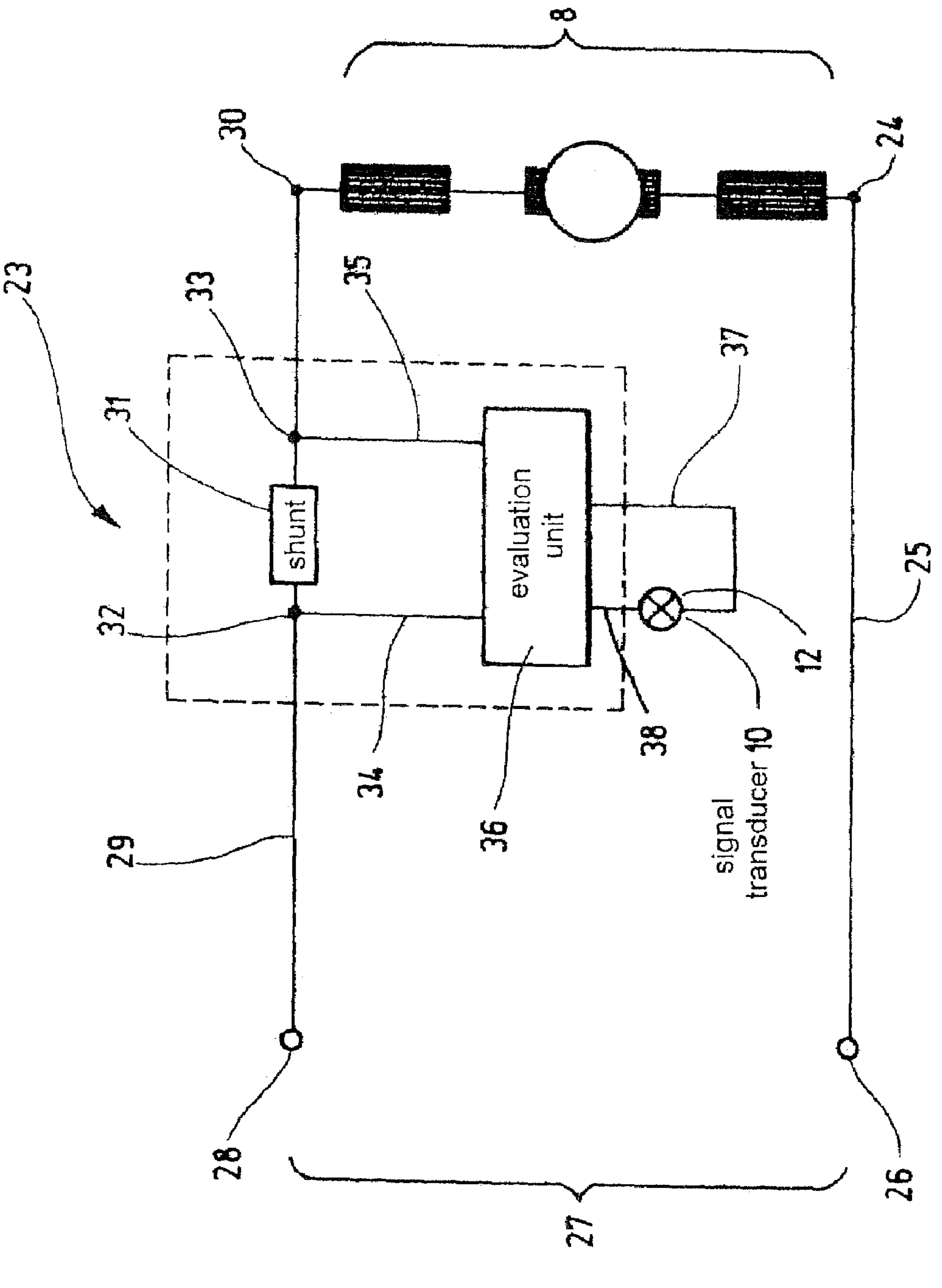
Figure 9:
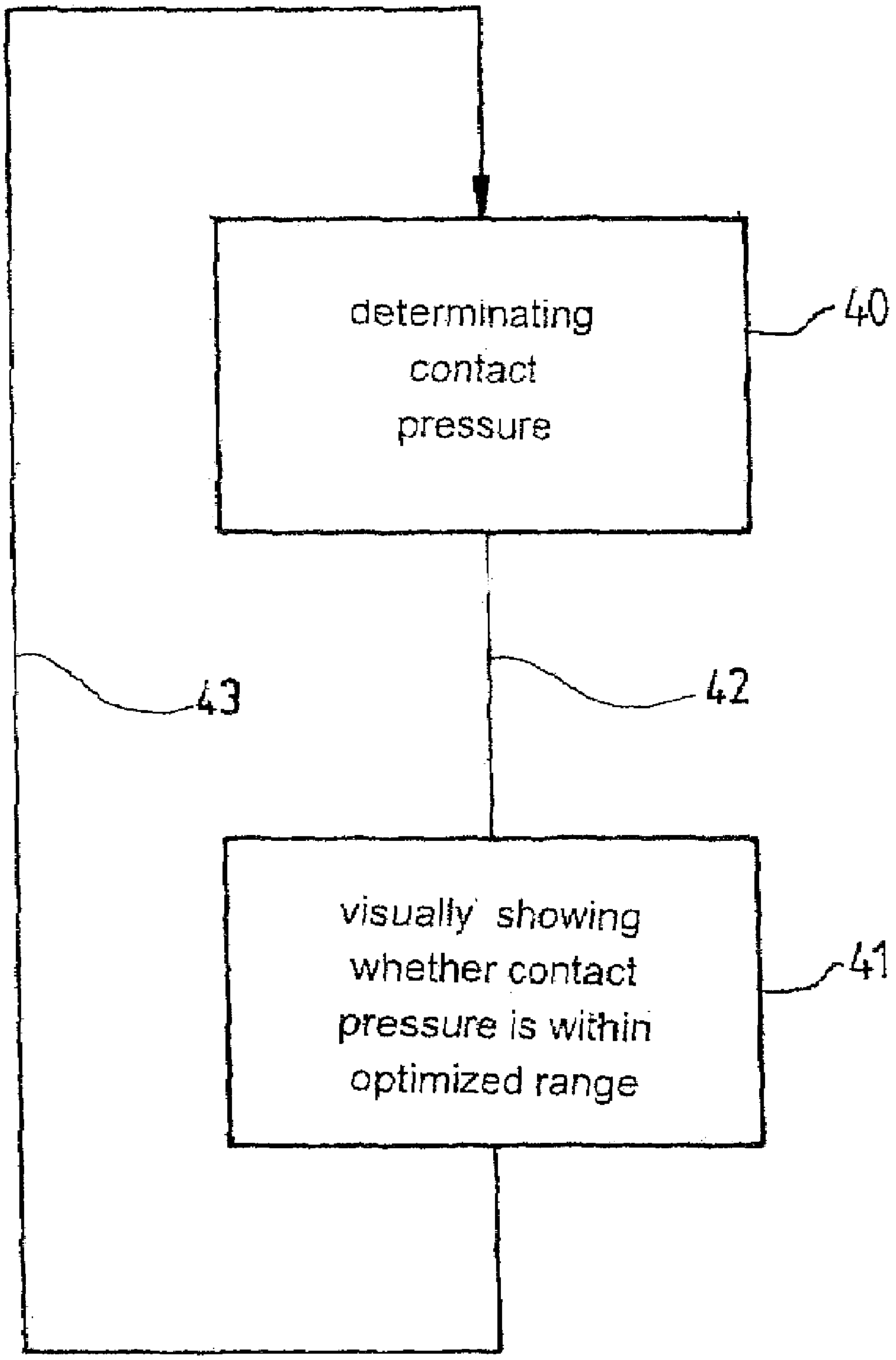
Figure 10:
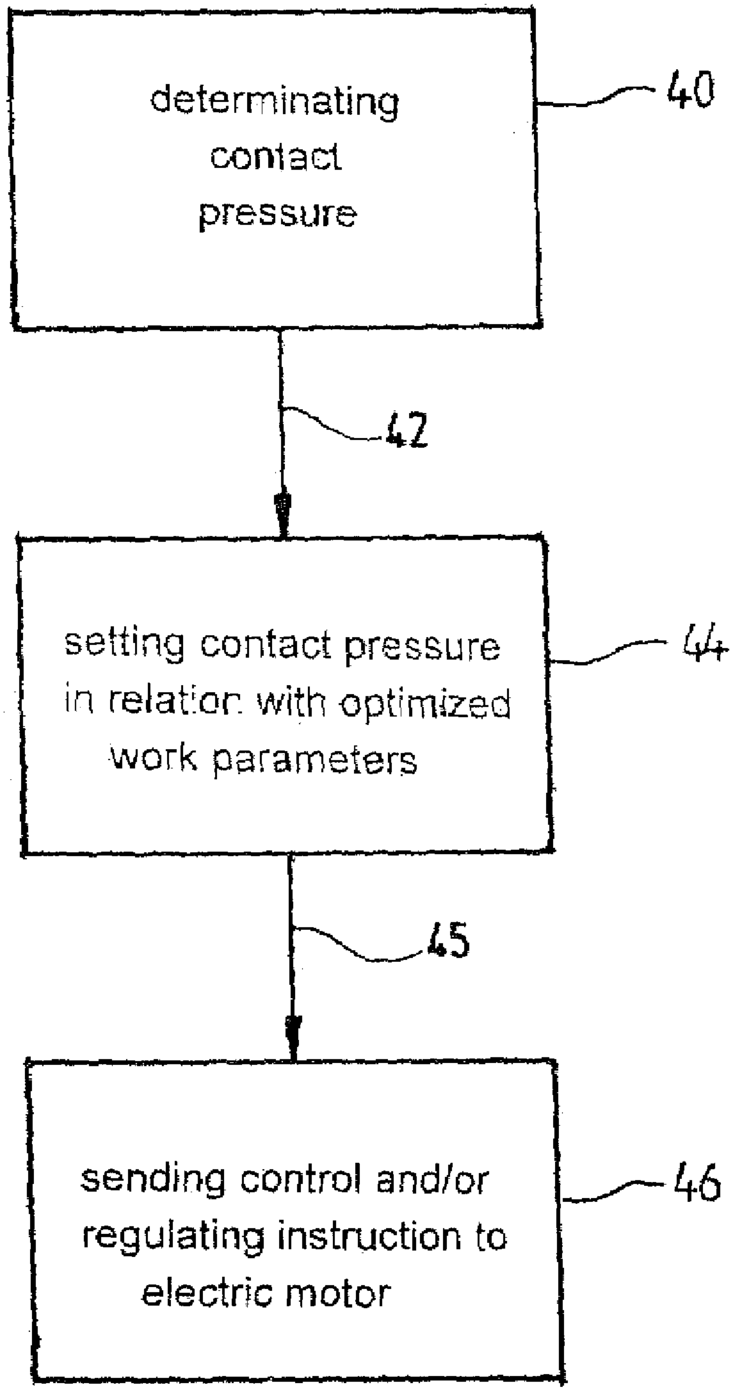

Shown are:

FIG. 1, an electric power tool, embodied as an eccentric grinder, with a sensor unit and a signal transducer, shown schematically;

FIGS. 2 through 6, examples for various displays of an optical signal transducer;

FIG. 7, an electric power tool, embodied as an eccentric grinder, with a sensor unit and a control and/or regulating unit;

FIG. 8, a basic circuit for measuring the current of an electric motor in an electric power tool;

FIG. 9, a flow chart of a method for guiding the operation of an electric power tool; and FIG. 10, a flow chart of a method for automatically guiding the operation of an electric power tool.

DESCRIPTION OF THE EXEMPLARY EMBODIMENTS

FIG. 1 shows an electric power tool 1, which is embodied as an eccentric grinder. It has a housing 2, an electrical supply cable 3, and a handle 4. FIG. 1 also shows a tool receptacle 6' with a tool 6, with which a workpiece 7 can be machined. The drive of the tool 6 is done by an electric motor 8. The electric motor 8, operating at a certain rpm and with a corresponding torque, drives the tool 6, embodied as an abrasive substrate. Depending on the embodiment of the electric power tool 1, either a fixed rotary speed is specified, or different values for the rotary speed can be set. In the electronically regulated electric power tools, the rotary speed, once set, is kept constant during the work process, or in other words under load. A sensor unit 9 ascertains the contact pressure of the tool 6 against the workpiece 7 that the user exerts in handling the electric power tool 1. The sensor unit 9 has a strain gauge, not shown in the drawing, or—in an alternative exemplary embodiment—a piezoelectric sensor. It may also, as described in further detail in conjunction with FIG. 8, have a current-measuring device 23 for measuring the current of the electric motor 8. For the description of the current-measuring device 23 of the sensor unit 9, see the description of FIG. 7. The sensor unit 9 cooperates with a signal transducer 10 via an electrical connection 11. The signal transducer 10 may be an optical signal transducer 12 and/or an acoustical signal transducer 13. In addition or alternatively, it may also be provided that the signal transducer is a signal transducer 14 that calls on the user's sense of touch, which acts vibratingly on the handle 4 in order to give the user a signal. The acoustical signal transducer 13 may be embodied as a bell, buzzer, or speaker. In particular, it is also possible to associate a device for speech output with the speaker. All three versions of the signal transducer 10 may be provided either alternatively or in various combinations.

When the user uses the electric power tool 1, he grasps it by the handle 4 and presses it with its tool 6 against the workpiece 7 to be machined. The sensor unit 9 ascertains the contact pressure, exerted by the user, of the tool 6 against the workpiece 7 and reports the applicable value to the signal transducer 10, which imparts information to the user about the magnitude of the contact pressure. If the user is exerting too low a contact pressure, then via the signal transducer 10 he receives the information that the contact pressure should be increased. If the contact pressure he is exerting is too high, he once again receives a signal accordingly from the sensor unit 9, so that he can reduce the contact pressure in order in this way to be able to exert the correct contact pressure required for that grinding operation.

In FIGS. 2 through 6, examples of optical signal transducer 12 are shown. The optical signal transducer 12—see FIG. 2—is, in the simplest cast, a light-emitting diode (LED) 15, for instance of green color. If the value determined for the contact pressure is within the optimized operating range, the optical signal transducer lights up. If the contact pressure in the optimized operating range is exceeded or undershot, the LED goes out. This tells the user when he is exerting the contact pressure within the optimized operating range. However, it is also conceivable for the LED to be a red LED, for instance, and the logic of the display by the optical signal transducer 12 is then such that not until a contact pressure that is not within the optimized operating range does the LED light up. In that case, the user is told when he is exerting a contact pressure that is not within the optimized operating range. In addition or alternatively, it is possible to vary the brightness of the LED, in order to indicate whatever contact pressure is being exerted. It is equally conceivable for the LED to blink if the contact pressure deviates from the optimized operating range. If the contact pressure is increased, the blinking frequency increases; if it is lessened, the blinking frequency decreases.

Figure 3:
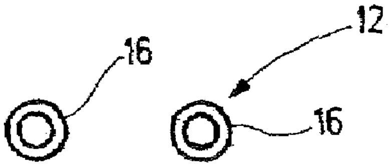

In FIG. 3, the optical signal transducer 12 has two light-emitting diodes 16, which make a more-differentiated statement possible. One LED is a red LED, and the other LED is a green LED. If the contact pressure is within the optimized operating range, the green LED lights up. If the contact pressure is outside the optimized operating range, the red LED lights up. If the contact pressure changes but is still within the optimized range, then the red LED lights up in addition to the green LED. If the contact pressure is no longer within the optimized operating range, then the green LED goes out, and only the red LED is still lighted.

Figure 4:
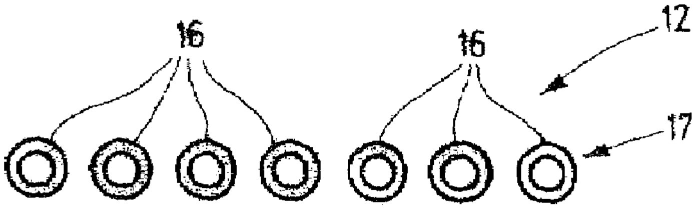

With an LED array 17 as shown in FIG. 4, a tendency or trend signal can be realized in addition. The LED array 17 comprises many light-emitting diodes 16 arranged in a row. The middle LED lights up when the contact pressure has a value in the optimized range, for instance at the beginning of the work process. If an LED to the right of the middle LED lights up, this means that the value for the contact pressure is higher than the optimal value. The farther the contact pressure is from the optimal value, the farther away the LED that lights up is from the middle. Analogously, an LED that lights up to the left of the middle LED means that the user is exerting overly low contact pressure. Thus the user is additionally told the type of deviation (too high or too low contact pressure) and the magnitude of the deviation from the optimized value. It is also possible to construct an LED array 17 of different-colored LEDs and in this way to make clarifying statements possible. It is understood that the LED array 17 may also be constructed of two or more rows.

Figure 5:

The statement of a bar display 18, as shown in FIG. 5, is analogous to that of the LED array 17. In addition, the magnitude of the contact pressure is indicated by means of the length of the bar.

Figure 6:
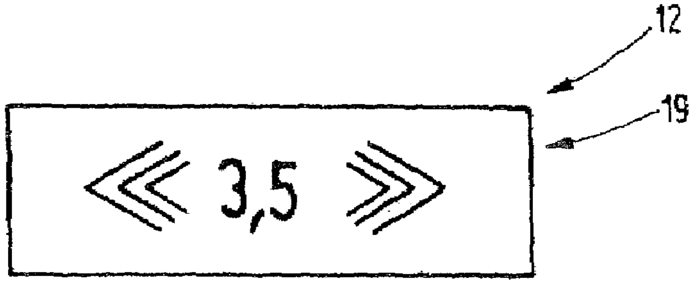

If the optical signal transducer 12 is a display 19, as shown in FIG. 6, then the value of the contact pressure is shown, and with the "greater than" and "less than" symbols, an exceeding or undershooting of the optimized value for the contact pressure is indicated.

It is equally possible to combine the various optical signal transducers 12. One example would be to combine a red LED 15, for instance, with a display field. In that case, the LED indicates when the contact pressure is not within the optimized range, and the display 19 indicates the specific value. The embodiments shown for the optical signal transducer 12 should be understood as merely examples. It is understood that the electric power tool of the invention may encompass still other embodiments for the optical display of the contact pressure.

It is also conceivable for the optical signal transducer 12 to be combined with the acoustical signal transducer 13. A green LED, for instance, lights up at the optimized contact pressure, and if the contact pressure is exceeded or undershot, an acoustical signal is sounded, and the LED goes out.

In FIG. 7, an electric power tool 1 embodied as an eccentric grinder is shown. Identical elements are identified by the same reference numerals as in FIG. 1, and reference is made to the description of FIG. 1. Instead of the signal transducer 10, there is a control and/or regulating unit 20, which cooperates with the electric motor 8. The contact pressure ascertained by the sensor unit 9 is supplied to the control and/or regulating unit 20 by means of an electrical connecting line 21. An electrical connection 22 makes an electrical contact between the control and/or regulating unit 20 and the electric motor 8. If the eccentric grinder of FIG. 7 is being used by the user, the following ensues: The user presses the tool 6 of the eccentric grinder with a certain contact pressure against the workpiece 7 to be machined. The tool 6 operates at a rotary speed, and a torque is established. The contact pressure is determined by means of the sensor unit 9 and forwarded to the control and/or regulating unit 20. The control and/or regulating unit cooperates with the electric motor 8 and changes the parameters of the electric motor, that is, the torque and/or the rotary speed, in such a way that the rotary speed and/or the torque fits that contact pressure, and the eccentric grinder is operating in an optimized operating range. Operation in an optimized operating range leads to a good outcome of the work and an optimized working time.

For work with an electric power tool embodied as a drilling screwdriver, for instance, the following applies: The tool 6 of the drilling screwdriver is a bit, with which a screw is screwed into a workpiece 7. An optimized operating range for a drilling screwdriver is distinguished by the fact that the bit does not spin, or in other words does not slip past the crosswise slot in the screw. In operation, particularly as a function of the screw and the workpiece, a certain torque will be established. If the contact pressure exerted by the user is too low for a certain torque, the bit will spin, and it is no longer possible to screw in the screw. The edges of the crosswise slot become damaged. In operation according to the invention, the sensor unit 9 ascertains the contact pressure and this is signalled to the user by the signal transducer 10. The user can accordingly exert the correct contact pressure so that screwing in will succeed without slipping off or spinning. It is also possible to use a drilling screwdriver with a control and/or regulating unit 20 that cooperates with the electric motor 8 and controls or regulates the torque and/or the rotary speed. This means in particular that for a specified contact pressure, only a torque which is within a limited range of values will be output. As a result, slipping off or spinning of the bit in the crosswise slot of the screw is avoided.

In FIG. 8, the current circuit of the schematically shown electric motor 8 is shown, with its terminals 24 and 30, the electrical connecting lines 25 and 29, and the terminals 26 and 28 of the power supply 27. The current-measuring device 23 with terminals 32 and 33, a shunt 31, and an evaluation unit 36 are fitted into the connecting line 29. For greater clarity in the illustration, the components that belong to the current-measuring device 23 are outlined by a box drawn in dashed lines. From the terminals 32 and 33, the electrical connecting lines 34 and 35 lead to the evaluation unit 36. The signal transducer 10, embodied in this drawing as an optical signal transducer 12, communicates with the evaluation unit 36 of the current-measuring device 23 by means of electrical connecting lines 38 and 37.

The current-measuring device 23 has the task of determining the current flowing through the electric motor 8 and from that current, ascertaining the contact pressure which the user is exerting on the tool 6, or on the tool receptacle 6'. The mode of operation of the current-measuring device 23 is as follows: As a result of the motor current, a voltage drop that is proportional to the resistance of the shunt 31 occurs at the shunt, so that between the terminal 32 and the terminal 33, a voltage difference occurs. This voltage difference is converted in the evaluation unit 36 into a value that corresponds to the. contact pressure. This procedure is possible because of the following given conditions: A contact pressure exerted on the tool 6, or on the tool receptacle 6', causes a certain torque to be established. The torque of the electric motor, in the saturation mode that normally prevails, is approximately proportional to the motor current. At a high contact pressure, a high torque will be established, and thus a high motor current will be ascertained. A low contact pressure will lead to a lower torque and thus to a lower motor current. There is accordingly a relationship between the contact pressure and the motor current. Since the motor current generates a corresponding voltage drop at the shunt 31 that is interpreted by the evaluation unit 36 as the contact pressure and is displayed to the user by means of the signal transducer 10, the user can carry out the required guidance of operation of the power tool; in other words, as a function of the signalling of the signal transducer 10, he is capable of increasing, lessening, or maintaining the contact pressure, depending on the information he receives.

In FIG. 9, a method for guiding the operation of an electric power tool 1 with a sensor unit 9 and a signal transducer 10—as shown in FIG. 1—is shown in the form of a flow chart. The first method step 40 contains the determination of the contact pressure with which the user presses the tool 6 of the electric power tool 1 against the workpiece 7 to be machined. The value ascertained for the contact pressure—represented by the numeral 42—is sent to the second method step 41. In the second method step 41, the user is visually shown whether the ascertained value of the contact pressure is within an optimized operating range. In the electric power tool 1, the contact pressure that must be exerted at a given time for performing work in the optimized operating range is stored in a memory. To this extent, the electric power tool 1 is capable of guiding the user automatically. By means of the invention, the user receives a classification or assessment of the contact pressure that he is exerting. The action of the user is shown in FIG. 3 by a line 43, which represents a feedback. Provision may be made for this feedback operation to be done constantly, or in other words continuously, or at certain time intervals.

Figure 2:
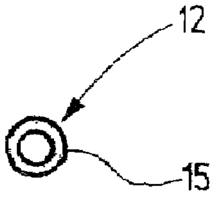

In FIG. 10, a method for guiding the operation of an electric power tool 1 with a sensor unit 9 and a control and/or regulating unit 20—as shown in FIG. 2—is shown as a flow chart. The contact pressure, determined in method step 40, is forwarded—as indicated by the line 42—to a second method step 44. In the second method step 44, this value is set into relation with optimized work parameters of the electric motor 8 that are stored in the electric power tool 1. A control and/or regulation instruction 45 of the control and/or regulating unit 20 is sent to the electric motor 8 in a third method step 46. This electric motor automatically adjusts its rotary speed and/or its torque such that the electric power tool works within the optimized operating range.

The invention claimed is:

1. An electric power tool, having an electric motor (8) acting to drive a tool (6) and having a sensor unit (9), which detects the contact pressure of the tool (6) against a workpiece (7) and cooperates with a signal transducer (10), wherein the sensor unit (9) has a current-measuring device (23), which detects the current of the electric motor (8), and wherein the sensor unit (9) further has a strain gauge and/or a piezoelectric sensor.

2. The electric power tool in accordance with claim 1, wherein the current-measuring device (23) has a shunt (31), through which the motor current flows, and an electronic evaluation unit (36).

3. The electric power tool in accordance with claim 1, wherein the signal transducer (10) is an optical and/or an acoustical signal transducer (12, 13) and/or a signal transducer (14) that calls on the sense of touch.

4. The electric power tool in accordance with claim 3, wherein the optical signal transducer (12) is at least one LED (15, 16) and/or an LED array (17) and/or a display (19) and/or a bar display (18).

5. The electric power tool in accordance with claim 3, wherein the acoustical signal transducer (13) is a speaker and/or a bell.

6. The electric power tool in accordance with claim 5, wherein a device that has a sound output in the form of a speech output is associated with the speaker.

7. The electric power tool in accordance with claim 1, wherein the signal transducer (10) is an acoustical signal transducer (13).

8. The electric power tool in accordance with claim 1, wherein the signal transducer (10) is a signal transducer (14) that calls on the sense of touch.

9. An electric power tool, having an electric motor (8) acting to drive a tool (6), having a control and/or regulating unit (20) serving to guide the operation of the electric motor (8) and having a sensor unit (9), which detects the contact pressure of the tool (6) against a workpiece (7) and cooperates with the control and/or regulating unit (20), wherein the sensor unit (9) has a strain gauge and/or a piezoelectric sensor, and wherein the sensor unit (9) further has a current-measuring device (23), which detects the current of the electric motor (8).

10. The electric power tool in accordance with claim 9, wherein the sensor unit (9) cooperates with a signal transducer (10).

11. The electric power tool in accordance with claim 9, wherein the control and/or regulating unit (20) controls and/or regulates the torque of the tool (6), or of a tool receptacle (6'), as a function of the contact pressure of the tool (6) against the workpiece (7).

12. The electric power tool in accordance with claim 9, wherein the control and/or regulating unit (20) controls and/or regulates the rotary Speed of the tool (6) or of a tool receptacle (6'), as a function of the contact pressure of the tool (6) against the workpiece (7).

13. The electric power tool in accordance with claim 9, wherein the control and/or regulating unit (20) controls and/or regulates the torque of the tool (6), or of a tool receptacle (6'), as a function of the contact pressure of the tool (6) against the workpiece (7) at a predetermined rotary speed.

14. The electric power tool in accordance with claim 9, wherein the current-measuring device (23) has a shunt (31), through which the motor current flows, and an electronic evaluation unit (36).

15. A method for guiding the operation of an electric power tool that has an electric motor (8) acting to drive a tool (6), a sensor unit (9), and a signal transducer (10), comprising the following steps:

detecting the current of the electric motor (8) with a current-measuring device (23);

determining the contact pressure of the tool (6) against a workpiece (7) by means of the sensor unit (9);

sending a feedback to a user as to whether the user is exerting the contact pressure in an optimized operating range via the signal transducer (10);

automatically adjusting a torque and/or a rotary speed of the electric motor.

16. A method for guiding the operation of an electric power tool that has an electric motor (8) acting to drive a tool (6), a sensor unit, (9) and a control and/or regulating unit (20), comprising the following steps:

detecting the current of the electric motor (8) with a current-measuring device (23);

determining the contact pressure of the tool (6) against a workpiece (7) by means of the sensor unit (9);

relating the contact pressure with optimized work parameters of the electric motor (8) stored in a memory of the control and/or regulating unit (20);

automatically adjusting the torque of the electric motor (8), of a tool (6), and/or of a tool receptacle (6'), as a function of the contact pressure, taking a predetermined rotary speed into account, wherein the predetermined rotary speed is set by a user at the onset of a work process and is kept constant.

* * * * *